United States Patent [19]
Tolbert et al.

[11] Patent Number: 5,112,013
[45] Date of Patent: May 12, 1992

[54] TIE STRAP STRUCTURE FOR ELECTRIC WIRING

[75] Inventors: Robert J. Tolbert, Detroit; Glen A. DeGrendel, Fraser, both of Mich.

[73] Assignee: Chrysler Corporation, Highland Park, Mich.

[21] Appl. No.: 660,189

[22] Filed: Feb. 25, 1991

[51] Int. Cl.$^5$ .............................................. B65D 63/00
[52] U.S. Cl. ................................................... 248/74.3
[58] Field of Search .................... 248/74.3, 73, 60, 62; 24/16 PB, 16 R, 17 A, 30.5 R

[56] References Cited

U.S. PATENT DOCUMENTS

| | | | |
|---|---|---|---|
| 4,186,902 | 2/1980 | Simons | 248/74.3 |
| 4,272,047 | 6/1981 | Botka | 248/74.3 |
| 4,708,306 | 11/1987 | Mitomi | 248/74.3 |
| 4,735,387 | 4/1988 | Hirano | 248/74.3 |
| 4,766,651 | 8/1988 | Kobayashi | 248/74.3 |

Primary Examiner—David M. Purol
Assistant Examiner—Robert A. Olson
Attorney, Agent, or Firm—Edward A. Craig

[57] ABSTRACT

A tie strap structure for electric wiring is provided. The tie strap structure includes a tie strap member having a flexible strap for encircling a bundle of wires and a buckle at one end of the strap for engaging the other end of the tie strap to secure the tie strap in place on a bundle of wires. A cross member is provided on the tie strap intermediate the ends thereof. A mounting bracket is provided including an elongated slot. The cross member is slidably retained in the slot. The slot extends in the direction of the length of a bundle of wires when the tie strap structure is mounted thereon. The fastener extends outwardly from the mounting bracket for reception in an opening provided in a support structure to which the tie strap structure is to be attached. The mounting bracket is slidable with respect to the cross member lengthwise of the bundle of wires to permit alignment of the fastener with the opening without stretching the bundle of wires.

6 Claims, 2 Drawing Sheets

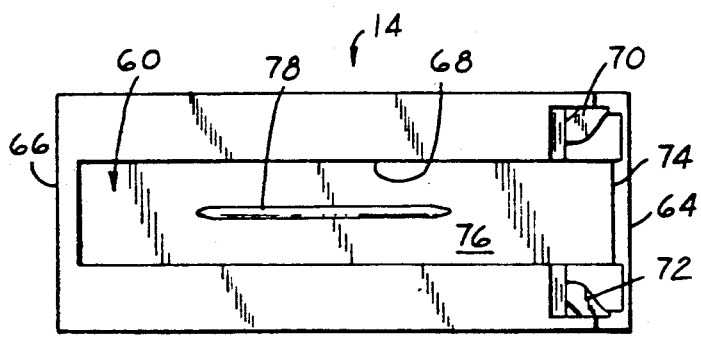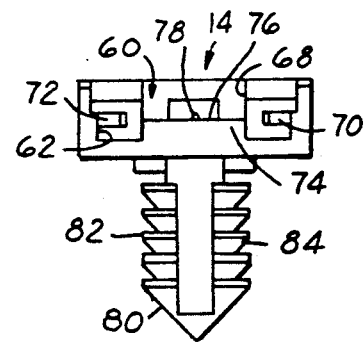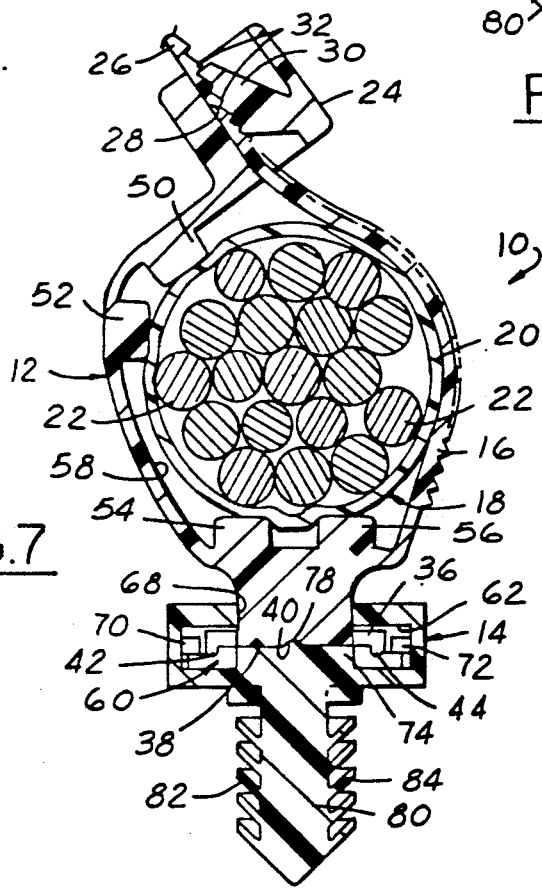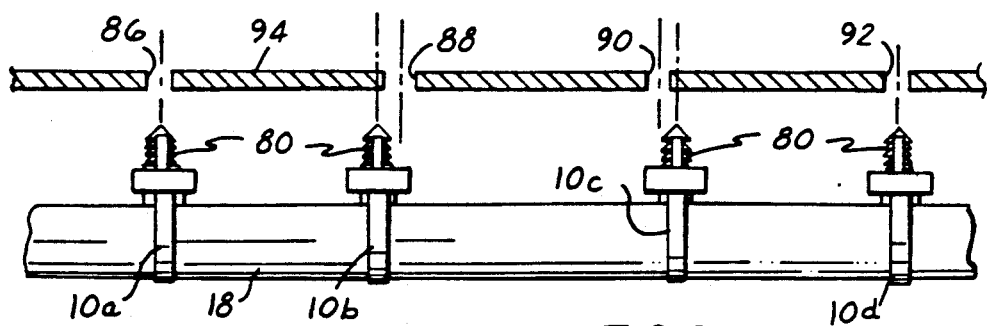

TIE STRAP STRUCTURE FOR ELECTRIC WIRING

BACKGROUND OF THE INVENTION

1. Field of the Invention

A tie strap structure is provided for electric wiring. A tie strap is provided which includes a cross member. The cross member, is slidably received in a mounting bracket having a fastener for securement to an opening. The mounting bracket may be adjusted with respect to the cross member to facilitate alignment of the fastener with the opening.

2. Description of Related Art

The tie strap structure of the present invention is particularly suited to mounting of wiring harnesses in vehicles. Modern vehicles include numerous electrical components. It is necessary to interconnect many of the components with each other for the reason that they frequently have interrelated functions and it is also necessary to connect the electrical components to a source of electrical power This situation has resulted in the need for extensive electrical wiring in vehicles. The electrical wiring is pre-formed into harness structures which are ultimately mounted in vehicles as discrete components. The wiring harnesses are commonly fabricated at a manufacturing facility and subsequently shipped to vehicle assembly plants for mounting in vehicles.

In the manufacture of wiring harnesses, discrete wires are unwound from large spools of wire and cut into desired lengths. The individual wires are then formed into bundles of wires of suitable length and type. Main portions of such bundles are usually secured together and protected from abrasion by use of a sheath which surrounds such bundle portions.

As will be appreciated, wiring harnesses, when assembled in vehicles, must be properly routed and secured in place. One common means for securing wiring harnesses in place is to secure a fastening device to the bundle of wires by means of a flexible tie strap. The tie strap includes a fastener which is quickly and easily secured in place by means of pre-punched openings provided in the vehicle sheet metal. In the manufacture of wiring harnesses, the tie straps are secured to the wiring harnesses at predetermined locations along the length of the harnesses. These locations correspond to openings provided in vehicle sheet metal.

In the initial manufacture of wiring harnesses, the tie straps are properly positioned along the length of the harnesses. However, the discrete wires which form the harnesses are initially wound onto spools and placed in minor tension so that the spool coils will be tightly wound. After the wires are unwound from the spools and formed into wiring harnesses, the tension is relieved. Such tension does result in slight elongation of the wires. Wires, being somewhat elastomeric, will tend to resume their normal length after the tension is relieved. Thus, even though the tie straps are initially properly located, the slight shrinkage in wiring harness length resulting from the removal of tension causes minor dislocation of the tie straps along the wiring harnesses. This shrinkage is a relatively slow process and also is not uniform and therefore cannot be predetermined which would permit compensating for such shrinkage during manufacture of the wiring harnesses. As a consequence, when it is attempted to mount the wiring harnesses in vehicles at an assembly plant, the fasteners of the tie straps frequently are not in exact alignment with the openings in the sheet metal of the vehicles. In order to attach the fasteners, assembly workers have commonly stretched the wiring harnesses a slight bit. Such stretching is undesirable because it requires the assembly worker to take a longer time to mount the harnesses.

In accordance with the present invention, this problem is resolved by providing tie strap structures having slidable mounting brackets which may easily be adjusted short distances to align the tie strap fasteners with the openings in the vehicle sheet metal.

SUMMARY OF THE INVENTION

A tie strap structure for electric wiring is provided. The tie strap structure includes a tie strap member which has a flexible tie strap for encircling a bundle of wires. A buckle is provided at one end of the tie strap for engaging the other end of the tie strap to secure the tie strap in place on a bundle of wires.

A cross member is provided on the tie strap intermediate the ends thereof. A mounting bracket is provided. The mounting includes an elongated slot. The cross member is slidably retained in the slot. The slot extends in the direction of the length of the bundle of wires when the tie strap structure is mounted thereon.

A fastener extends outwardly from the mounting bracket for reception in an opening provided in a support structure to which the tie strap structure is to be attached. The mounting bracket is slidable with respect to the cross member lengthwise of the bundle of wires to permit alignment of the fastener with the opening without stretching the bundles of wires.

The cross member has an outer face. The mounting bracket has a face oppositely disposed thereto. One of the faces has an elongated ridge projecting outwardly therefrom. The other of the faces has an elongated groove therein. The ridge is receivable in the groove to initially position the cross member centrally of the slot. Preferably, the ridge is provided on the mounting bracket face and is located centrally of the ends of the slot.

The slot includes a passageway extending from one end of the mounting bracket and terminating short of the other end of the mounting bracket. The slot also includes an elongated opening provided in the mounting bracket. The elongated opening extends from one end of the bracket for the length of the passageway. The opening is in communication with the passageway. The cross member includes a body having outwardly projecting tab portions on oppositely disposed sides thereof. The tab portions extend into the passageway to a point beyond the opening to prevent removal of the cross member through the opening. The cross member body extends out of the opening and is guided in sliding movement by the opening.

A pair of oppositely disposed flexible locking fingers are provided at said one end of the mounting bracket. The passageway is of sufficient width to permit the locking fingers to flex towards the outer side edges of the passageway to facilitate insertion of the cross member into the slot. The bracket includes an elongated central projection spaced from the outer side edges of the passageway. This projection blocks inward flexing of the locking fingers to thereby prevent removal of the cross member from the slot. The ridge is preferably provided on the face of the projection.

IN THE DRAWINGS

FIG. 5 is a top plan view of the tie strap structure mounting bracket;

FIG. 6 is an end elevational view of the mounting bracket;

FIG. 7 is a sectional view illustrating the tie strap structure to a wire bundle; and FIG. 8 is a view of a portion of a wire bundle having four tie strap structures mounted thereon and juxtaposed with reference to openings provided in support structure preparatory to securing the wire bundle to the support structure.

DETAILED DESCRIPTION OF A PREFERRED EMBODIMENT

Figure 1:
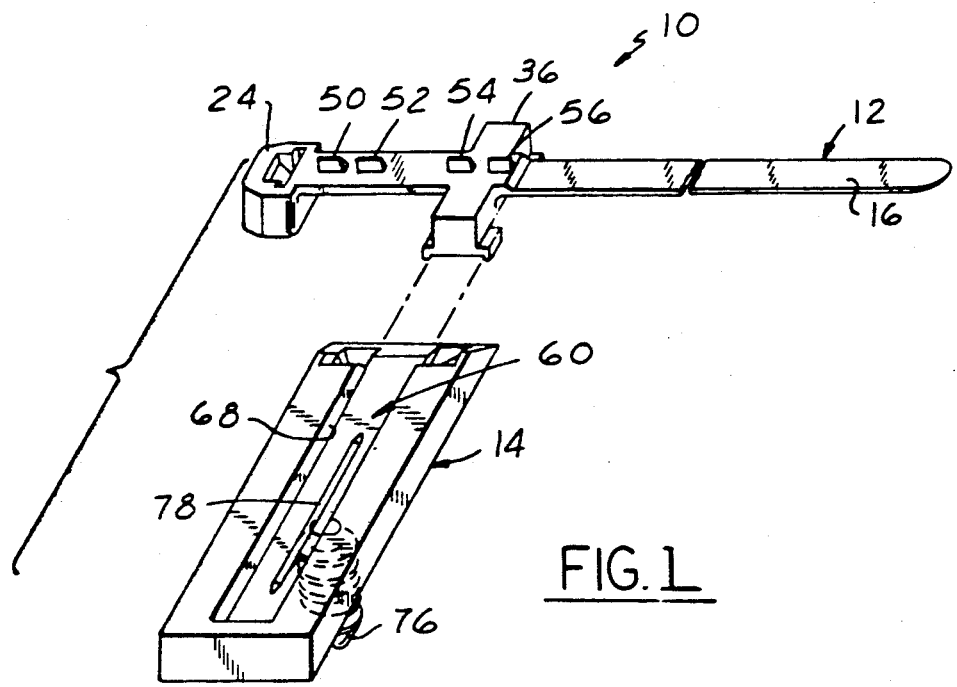
FIG. 1 is an exploded perspective view illustrating one embodiment of the tie strap structure of the present invention.
Figure 2:
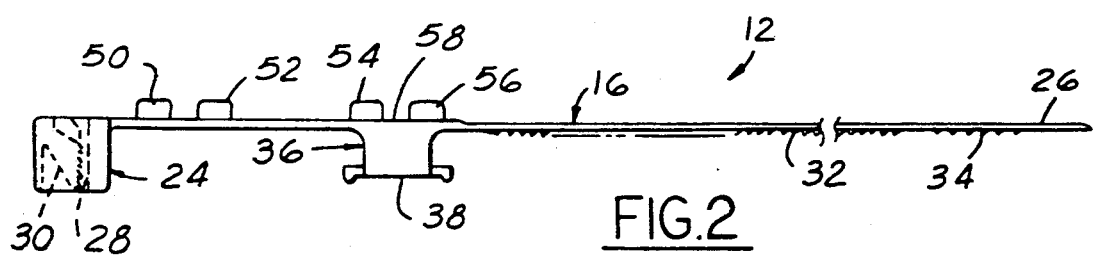
FIG. 2 is a side elevational view of the tie strap member.
Figure 3:
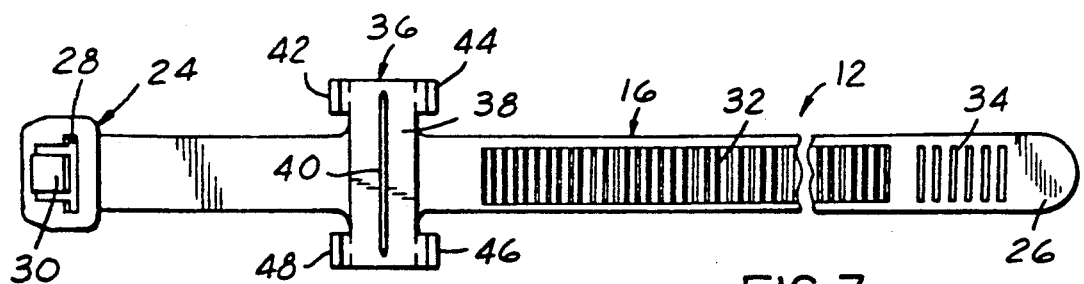
FIG. 3 is a top plan view of the tie strap member.
Figure 4:
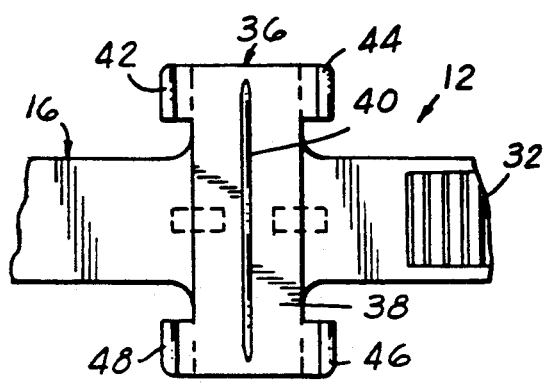
FIG. 4 is an enlarged view of the tie strap member cross member.

Referring to FIG. 1, it will be noted that the tie strap structure 10 includes a tie strap member 12 and a mounting bracket 14.

The tie strap member 12 includes a flexible tie strap 16 illustratively fabricated of plastic. The tie strap 16 is adapted to encircle a bundle of wires 18 as shown in FIG. 7. The bundle of wires 18 typically includes a protective sheath 20 which encloses a plurality of discrete wires 22. The bundle of wires 18 forms part of a vehicle wiring harness. Individual wires 22 branch off from the bundle at desired points for connection to electrical apparatus. It is necessary to route and attach the wiring harness in a predetermined location of the vehicle. Tie strap structure 10 is provided for the attachment function.

Referring to FIGS. 1-4 and 7, it will be noted that a buckle 24 is provided at one end of the tie strap 16 for engaging the other end 26 of the tie strap to secure the tie strap in place on the bundle of wires 18. The end 26 is inserted into a slot 28 provided in the buckle 24. A catch structure 30 is provided within the slot 28 to engage serrations 32 provided on the exterior surface of the tie strap 16 to secure the tie strap 16 in place on the bundle of wires 18. A plurality of ridges 34 are provided adjacent the end 26 of the tie strap for insertion into the slot 28 to temporarily secure the end 26 in the buckle 24 as desired. The ridges 34 permit removal of the end 26 from the buckle 24. However, the serrations 32 form a permanent lock preventing removal of the tie strap from the buckle after engagement thereof by the catch structure 30.

A cross member 36 is provided on the tie strap 16 intermediate the ends thereof. The cross member 36 is an elongated rectangular body having an outer face 38. An elongated groove 40 is provided in face 38. Outwardly projecting tabs 42, 44, 46, 48 are provided in the corners of the cross member 36 adjacent the outer face 38. Two pairs of projections 50, 52 and 54, 56 are provided on the inner face 58 of the tie strap member 12.

The mounting bracket 14 includes an elongated slot 60. The cross member 36 is slidably retained in the slot 60. The slot 60 extends in the direction of the length of the bundle of wires 18 when the tie strap structure 10 is mounted thereon as will be noted in FIG. 7. Referring to FIGS. 5-7, it will be noted that the slot 60 comprises a passageway 62 extending from one end 64 of the mounting bracket 14 and terminating short of the other end 66. An elongated opening 68 is provided in the mounting bracket 14 extending from the end 64 for the length of the passageway 62. The opening 68 is in communication with the passageway 62. A pair of oppositely disposed flexible locking fingers 70, 72 are provided at the entrance end of the passageway 62. When the cross member 36 is inserted into the slot 62, the passageway 62 is of sufficient width to permit the locking fingers 70, 72 to flex toward the outer side edges of the passageway to facilitate passage of the tabs 42, 44, 46, 48 thereby and thus insertion of the cross member 36 into the slot 60. The mounting bracket 14 includes an elongated central projection 74 which is spaced from the outer side edges of the passageway 62. The projection 74 blocks inward flexing of the locking fingers 70, 72 to thereby prevent passage of the tabs out of the slot 60 and thus prevents removal of the cross member 36 from the slot 60. The cross member 36 is, however, shorter than the length of the passageway 62 with the result that the cross member 36 and mounting bracket 14 are relatively slidable with respect to each other lengthwise to the bundle of wires 18. This feature is utilized to permit alignment of a fastener 80 on the mounting bracket 14 to be aligned with an opening in support structure which will be later described. The cross member 36 extends out of the opening 68 and is guided in sliding movement by the edges of the opening.

The projection 74 has a face 76 oppositely disposed from the face 38 of the cross member 36 and in sliding contact therewith. An elongated ridge 78 is provided on the face 76. The ridge 78 is centrally located with respect to the ends of the slot 60. The ridge 78 is receivable in the groove 40 to position the cross member 36 centrally of the slot 60. This is the desired initial position of the cross member 36 with respect to the slot 60 inasmuch as it permits relative adjustment of the cross member 36 and mounting bracket 14 in either direction.

Referring now to FIGS. 7 and 8, the tie strap structure 10 is illustratively mounted on the bundle of wires 18. It will be noted that the bundle of wires 18 is positioned between the pairs of projections 50, 52 and 54, 56. These projections impinge on the sheath 20. This relationship fixes the position of the tie strap structure 10 on the bundle of wires 18, preventing lengthwise or circular shifting of the tie strap structure 10 on the bundle. Consequently, after the tie strap structure 10 has been mounted, its position on the bundle can be relied upon.

A fastener 80 extends outwardly from the mounting bracket 14. The fastener 80 is of conventional structure and includes two sets of herringbone-like mounting elements 82, 84. The fasteners 80 are adapted to be received in openings 86, 88, 90, 92 provided in support structure 94 as, for example, automobile sheet metal as shown in FIG. 8. Four tie strap structures 10a, 10b, 10c, 10d are illustratively mounted on the bundle of wires 18. The fasteners 80 are supposed to align with the openings 86, 88, 90, 92. As will be noted, two of the fasteners forming part of the tie strap structures 10a and 10d are in alignment with their respective openings. However, tie strap structure 10b is out of alignment to the left to the opening 88 and tie strap structure 10c is out of alignment to the right of opening 90. As previously mentioned, this usually occurs because of shrinkage of the wires 22 forming the bundle of wires 18. This shrinkage occurs after fabrication of the bundle of wires due to the relief of tension resulting from unwinding the wires from a spool. It also happens occasionally that the openings are not formed properly or that the tie strap structures are not mounted where they should be along the length of the bundle of wires. With tie strap structures 10 of the present invention, it is only necessary to shift the mounting brackets 14 to the right with respect the tie strap structure 10b or to the left with respect to the tie strap structure 10c in order to place the fasteners in proper alignment with the openings and subsequent insertion thereinto for attachment of the bundle of wires 18 to the support structure 94. Previously, it had been necessary for the assembler to stretch the bundle of wires to gain the proper alignment.

We claim:

1. A tie strap structure for electric wiring comprising a tie strap member including a flexible tie strap for encircling a bundle of wires, a buckle provided at one end of the tie strap for engaging the other end of the tie strap to secure the tie strap in place on a bundle of wires, a cross member provided on the tie strap intermediate the ends thereof, a mounting bracket including an elongated slot, the cross member being slidably retained in the slot, the slot adapted to extend in the direction of the length of a bundle of wires when the tie strap structure is secured on a bundle of wires, a fastener extending outwardly from the mounting bracket for reception in an opening provided in a support structure to which the tie strap structure is to be attached, the mounting bracket being slidable with respect to the cross member lengthwise of a bundle of wires to permit alignment of the fastener with an opening without stretching a bundle of wires, the cross member having an outer face, the slot having a face oppositely disposed thereto, one of the faces having an elongated ridge projecting outwardly therefrom, the other of the faces having an elongated groove therein, the ridge being receivable in the groove to initially position the cross member in the slot.

2. A tie strap structure as defined in claim 1 wherein the ridge is provided on said slot face, the ridge being located centrally of the ends of the slot.

3. A tie strap structure as defined in claim 1, wherein the slot comprises a passageway extending from one end of the mounting bracket and terminating short of the other end of the mounting bracket, an elongated opening in the mounting bracket extending from said one end for the length of the passageway, the opening being in communication with the passageway, the cross member comprising a body having outwardly projecting tab portions on oppositely disposed sides thereof, the tab portions extending into the passageway to a point beyond the opening to prevent removal of the cross member through the opening, the cross member body extending out of the opening and being guided in sliding movement by the opening.

4. A tie strap structure as defined in claim 3, wherein a pair of oppositely disposed flexible locking fingers are provided at said one end of the mounting bracket, the passageway being of sufficient width to permit the locking fingers to flex toward the outer side edges of the passageway to facilitate insertion of the cross member into the slot, the mounting bracket including an elongated central projection spaced from the outer side edges of the passageway, said projection blocking inward flexing of the locking fingers to thereby prevent removal of the cross member from the slot.

5. A tie strap structure as defined in claim 4, wherein the cross member has an outer face, said projection having a face oppositely disposed thereto, one of the faces having an elongated ridge projecting outwardly therefrom, the other of the faces having an elongated groove therein, the ridge being receivable in the groove to initially position the cross member in the slot.

6. A tie strap structure as defined in claim 5, wherein the ridge is provided on said projection face, the ridge being located centrally of the ends of the slot.

* * * * *